US005703462A

United States Patent [19]

Woody et al.

[11] Patent Number: 5,703,462

[45] Date of Patent: Dec. 30, 1997

[54] INDUCTIVE COUPLER ASSEMBLY HAVING ITS PRIMARY WINDING FORMED IN A PRINTED WIRING BOARD

[75] Inventors: George R. Woody, Redondo Beach; Scott D. Downer, Torrance, both of Calif.

[73] Assignee: Delco Electronics Corp., Kokomo, Ind.

[21] Appl. No.: 679,587

[22] Filed: Jul. 15, 1996

[51] Int. Cl.$^6$ .......... H02J 7/04

[52] U.S. Cl. .......... 320/2; 336/DIG. 2

[58] Field of Search .......... 320/2; 336/200, 336/232, DIG. 2; 219/670, 672, 675

[56] References Cited

U.S. PATENT DOCUMENTS

| | | | |
|---|---|---|---|
| 5,434,493 | 7/1995 | Woody et al. | 320/2 |
| 5,457,378 | 10/1995 | Woody | 320/21 |
| 5,506,489 | 4/1996 | Abbott et al. | 320/21 |
| 5,521,573 | 5/1996 | Inoh et al. | 336/200 X |
| 5,545,966 | 8/1996 | Ramos et al. | 320/2 |
| 5,600,222 | 2/1997 | Hall et al. | 320/2 |
| 5,606,237 | 2/1997 | Biasotti et al. | 320/2 |

*Primary Examiner*—Peter S. Wong
*Assistant Examiner*—Patrick B. Law
*Attorney, Agent, or Firm*—Mark A. Navarre

[57] ABSTRACT

An inductive coupler having an antenna and primary winding formed as part of a single structure that can be readily and consistently produced using printed wiring board manufacturing techniques. The coupler has the primary winding and antenna are formed as part of a printed wiring board. A coupler housing having two mating coupler halves secures a center magnetic core and the printed wiring board therebetween. The coupler housing also secures a cable that is coupled between selected printed circuit layers of the primary winding and a power source for coupling energy to the charging coupler.

5 Claims, 3 Drawing Sheets

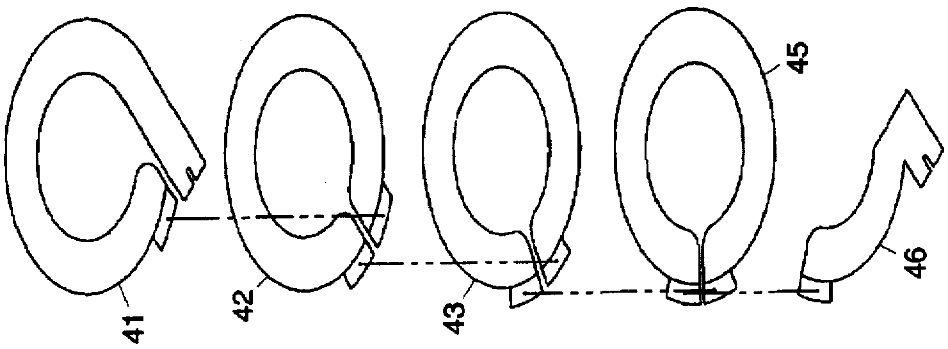
Fig. 6
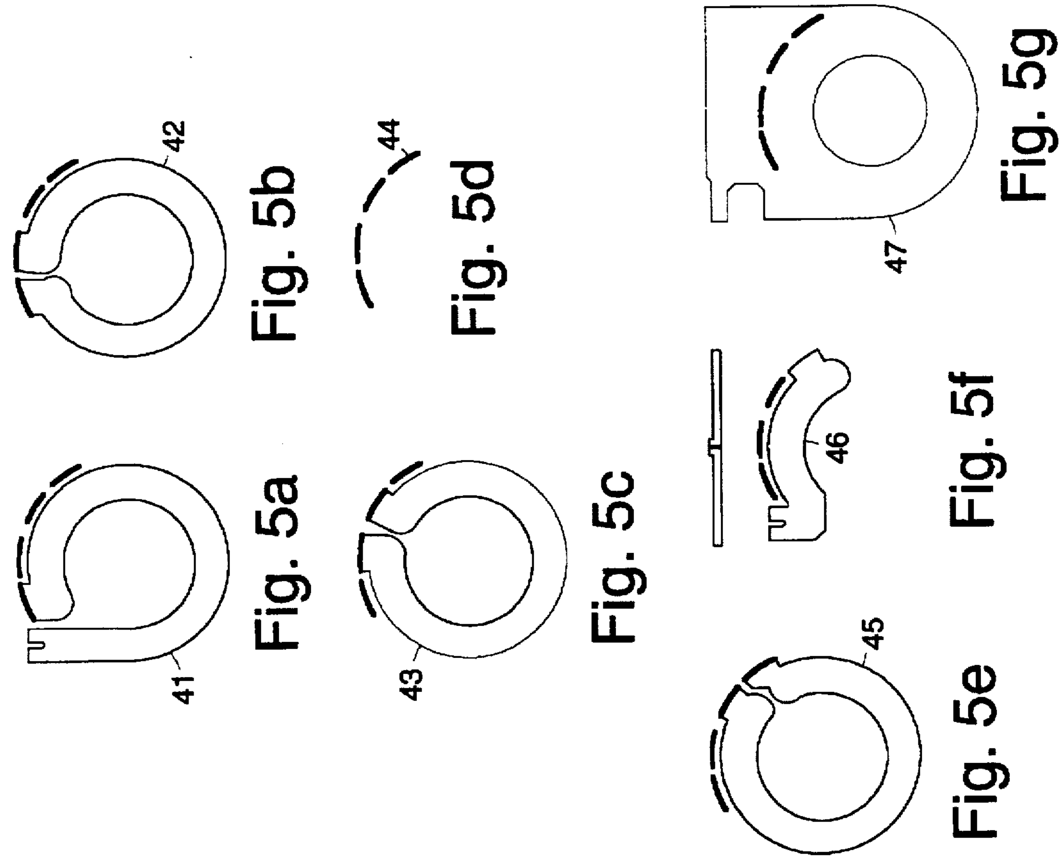
Fig. 5a
Fig. 5b
Fig. 5c
Fig. 5d
Fig. 5e
Fig. 5f
Fig. 5g

INDUCTIVE COUPLER ASSEMBLY HAVING ITS PRIMARY WINDING FORMED IN A PRINTED WIRING BOARD

BACKGROUND

The present invention relates generally to inductive couplers, and more particularly, to an improved inductive coupler having a printed wiring board that forms a primary winding and antenna.

The assignee of the present invention designs and manufactures inductive charging systems for use in charging electric vehicles. The charging system employs a charge port into which an inductive coupler is inserted to charge the electric vehicle. The inductive coupler forms a primary winding of a transformer and the charge port forms a secondary winding of the transformer. The charging system couples high frequency, high voltage AC power to the transformer which charges propulsion batteries of the vehicle.

A prior primary winding developed for use in the inductive coupler had a manufacturing process that was complex, labor intensive, expensive, and prone to failures. An antenna portion of the coupler was previously made using coaxial wire that was trimmed and soldered with an extra outer braid layer to form a dipole antenna. This was not a repeatable process and caused a wide variation in performance. Therefore, it would be an improvement in the an to have a coupler design that is readily manufacturable and provides consistent performance.

Accordingly, it is an objective of the present invention to provide for an improved inductive coupler for use with an inductive charger system that is used to charge propulsion batteries of an electric vehicle. It is a further objective of the present invention to provide for an improved inductive coupler having a printed wiring board that forms a primary winding and antenna.

SUMMARY OF THE INVENTION

To meet the above and other objectives, the present invention provides for an improved inductive coupler by combining an antenna and primary winding into a single structure that can be readily and consistently produced using conventional printed wiring board (PWB) manufacturing techniques. The primary winding and antenna are formed as part of a printed wiring board of the coupler. Consequently, the inductive coupler is less costly to produce and improves the overall performance of charging systems in which it is used.

The coupler, in conjunction with a charge port of the charging system, is medium by which electric power is transferred by means of inductive coupling. The shape of the coupler is esthetically pleasing and functional. The coupler is somewhat thicker that previously used designs. The coupler houses the printed wiring board which forms a primary winding and communication antenna, a magnet that is used to activate a switch in the mating charge port, and a ferrite puck that is visible from the outside of the coupler. The shape of the puck and primary winding gives the coupler its characteristic disc shape.

The shape of the coupler is a product of the functionality of its end use. The internal construction is different from previous coupler designs in that it utilizes the printed wiring board as the primary winding as opposed to more costly bussbar type folded turns and spiral pressed turns. A 915 MHz band carrier antenna is formed as part of the printed wiring board. Heretofore, a separate labor-intensive dipole antenna made from a coaxial cable was used. The printed wiring board meets safety requirements for insulation integrity, voltage spacing, and flame resistance. Early couplers were much thinner which did not provide adequate cooling needed for high power charging.

The present coupler design has been chosen as a standard interface for use in charging systems developed by the assignee of the present invention. It has a thicker cross section that can accommodate coupler designs within its envelope to provide charging capacities up to 130 KW of power or higher. In addition, the location of its grounding shield was improved by moving the termination of the outer grounding shield closer to the power leads of the primary winding which improved EMI compatibility.

The present invention is intended for use in inductive coupling transformers for Magnecharge™ electric vehicle charging systems manufactured by the assignee of the present invention. The Magnecharge electric vehicle charging system previously used a coupler design that was too thin to be used for higher charge rates and had a primary winding that was based on a pressed spiral copper configuration that was laminated with insulation. The present invention as implemented saves over $100 in material and labor costs over the previous coupler design.

The thicker coupler design allows heat exchangers to be installed in charger models used for higher power charging levels. A thin cross section heat exchanger causes pressure drops across the coupler that are too high to be practical. The thicker cross section is also compatible with lower charge rate charger models, that provide power output of 6.6 KW or less, which do not require a heat exchanger to cool the primary winding. In addition, there are tactile feel features on the side of the coupler that comprise conductive plastic strips at the base that contact copper fingers in the charge port to provide for EMI shielding. This is needed because the thicker coupler requires a larger slot width in the charge port, which can increase radiated emissions. The coupler also has features that couple it to a locking mechanism.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIGS. *5a–5g* illustrate printed wiring board layers employed in the inductive coupler of FIG. 2; and FIG. 6 illustrates how the layers of the printed wiring board are attached to each other to form a four-turn winding.

DETAILED DESCRIPTION

Figure 1:
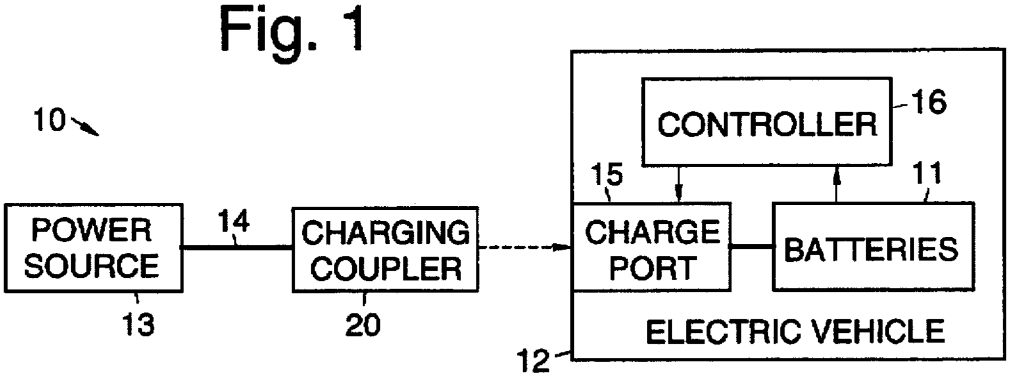
FIG. 1 is a block diagram that illustrates an inductive charging system employing an inductive coupler in accordance with the principles of the present invention that is used to charge propulsion batteries of an electric vehicle.

Referring to the drawing figures, FIG. 1 is a block diagram that illustrates an inductive charging system 10 employing an inductive charging coupler 20 or charge probe 20 in accordance with the principles of the present invention.

The inductive charging system 10 is comprised of a power source 13 that is coupled by way of a power cable 14 to the inductive charging coupler 20. The inductive charging coupler 20 is designed to be inserted into a charge port 15 located in an electric vehicle 12 (indicated by the dashed arrow). The inductive charging coupler 20 comprises a primary of a transformer while the charge port 15 comprises the secondary thereof. Once the inductive charging coupler 20 is inserted into the charge port 15, power is transferred from the power source 13 to propulsion batteries 11 of the electric vehicle 12 under control of a controller 16.

Figure 2:
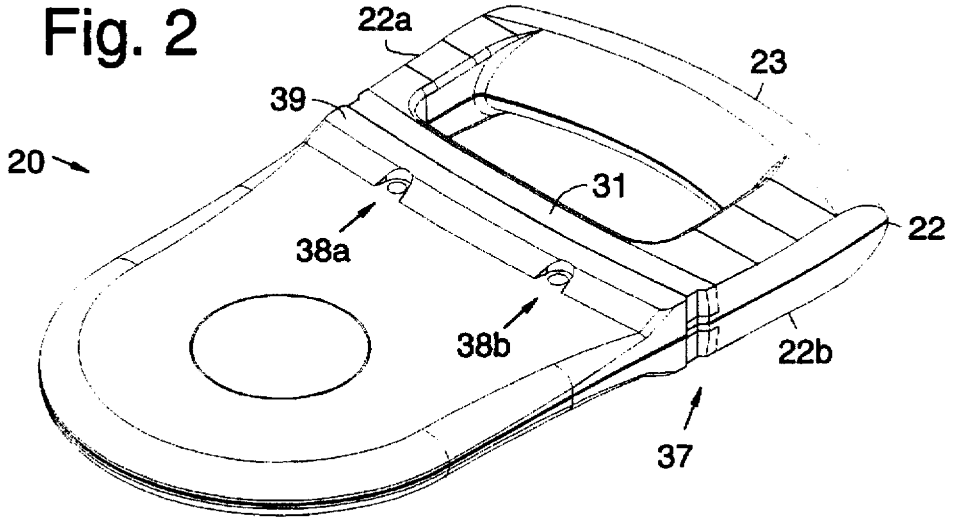
FIG. 2 is a perspective view of the inductive coupler in accordance with the present invention.
Figure 3:
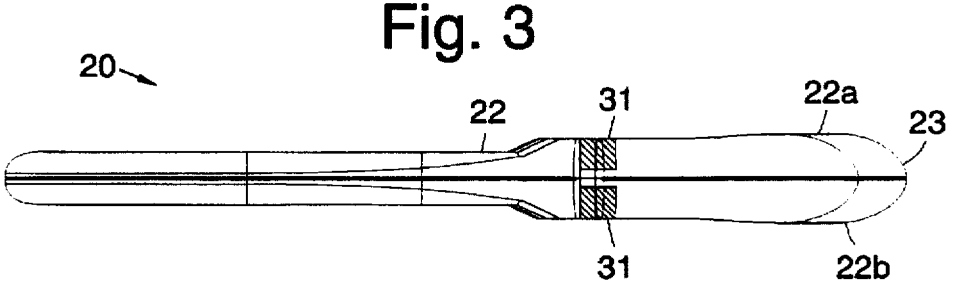
FIG. 3 is a side view of the inductive coupler of FIG. 2.

FIGS. 2 and 3 show perspective, side and exploded views, respectively, of the inductive charging coupler 20. FIGS. 2 and 3 also show the characteristic shape of the coupler 20. The inductive charging coupler 20 comprises a plastic coupler housing 22 that has two mating coupler halves **22*a*, 22*b* that are configured to provide a handle 23. The inductive charging coupler 20 has a center magnetic core 24 or "puck" 24, that may be comprised of ferrite, for example. A primary winding 25 is disposed around the center magnetic core 24 and is formed as a plurality of layers of a printed wiring board 40. Details of the printed wiring board 40 will be discussed with reference to FIGS. 5 and 6. A charger cable 26, or other current carrying means 26, is coupled to the primary winding 25 and to the power source 13 for coupling energy to the charging coupler 20. The charging coupler 20 is designed to be inserted into an opening in the charge port 15 in order to couple power to the batteries 11 from the power source 13. A plurality of magnets 33 are provided that are used to activate a proximity switch (not shown) located in the charge port 15 that is used to provide an indication that the charge coupler 20 is properly inserted into the charge port 15. An antenna 35 is formed as an electrical trace on the printed wiring board 40. The antenna 35 is used to couple communications signals between control electronics in the charging system and electronics in the electric vehicle 12. The coupler 20 includes an opening 38*a* and a coupler stop 38*b* that are employed to lock it into the charge port 15**.

The mating coupler halves **22*a*, 22*b* of the inductive charging coupler 20 enclose the primary winding 25 and the center magnetic core 24, and secures the charger cable 26 in the handle 23. The handle 23 includes a plurality of grounding clips 28 that engage outer shielding 29 of the charger cable 26. Conductive plastic strips 31 are disposed along an exterior portion of the coupler 20 between the handle 23 and the primary winding 25. The conductive plastic strips 31 engage metallized electromagnetic interference (EMI) fingers (not shown) on the charge port 15 when the coupler 20 is inserted into the charge port 15. A strain relief member 32 surrounds the charger cable 26 at a point where it exits the handle 23, and is secured by the two mating coupler halves 22*a*, 22*b***.

The coupler housing 22 may be made using an insertion molding process. First the conductive plastic strip 31 is molded and then inserted in the mold to make the entire coupler housing 22. The coupler 20 is made in two halves **22*a*, 22*b* that are bonded, ultrasonic welded, or hot plate welded together. The inside walls of the coupler halves 22*a*, 22*b* are metalized so the coupler 20 is completely shielded and can be connected internally to the shielded outer shielding 29 of the charger cable 26 and to the conductive plastic strip 31. The grounding clips 28 inside of the handle 23 make contact with the cable shielding 29 after the two coupler halves 22*a*, 22*b* are joined together by adhesive or ultrasonic welding methods. The conductive plastic strip 31 of the coupler 20 is then grounded to the outer braided 29. When the coupler 20 is inserted into the charge port 15 located in the vehicle, the conductive plastic strip 31 makes contact with the EMI fingers in the charge port 15. The fingers are attached to a chassis ground of the vehicle 12**.

Figure 4:
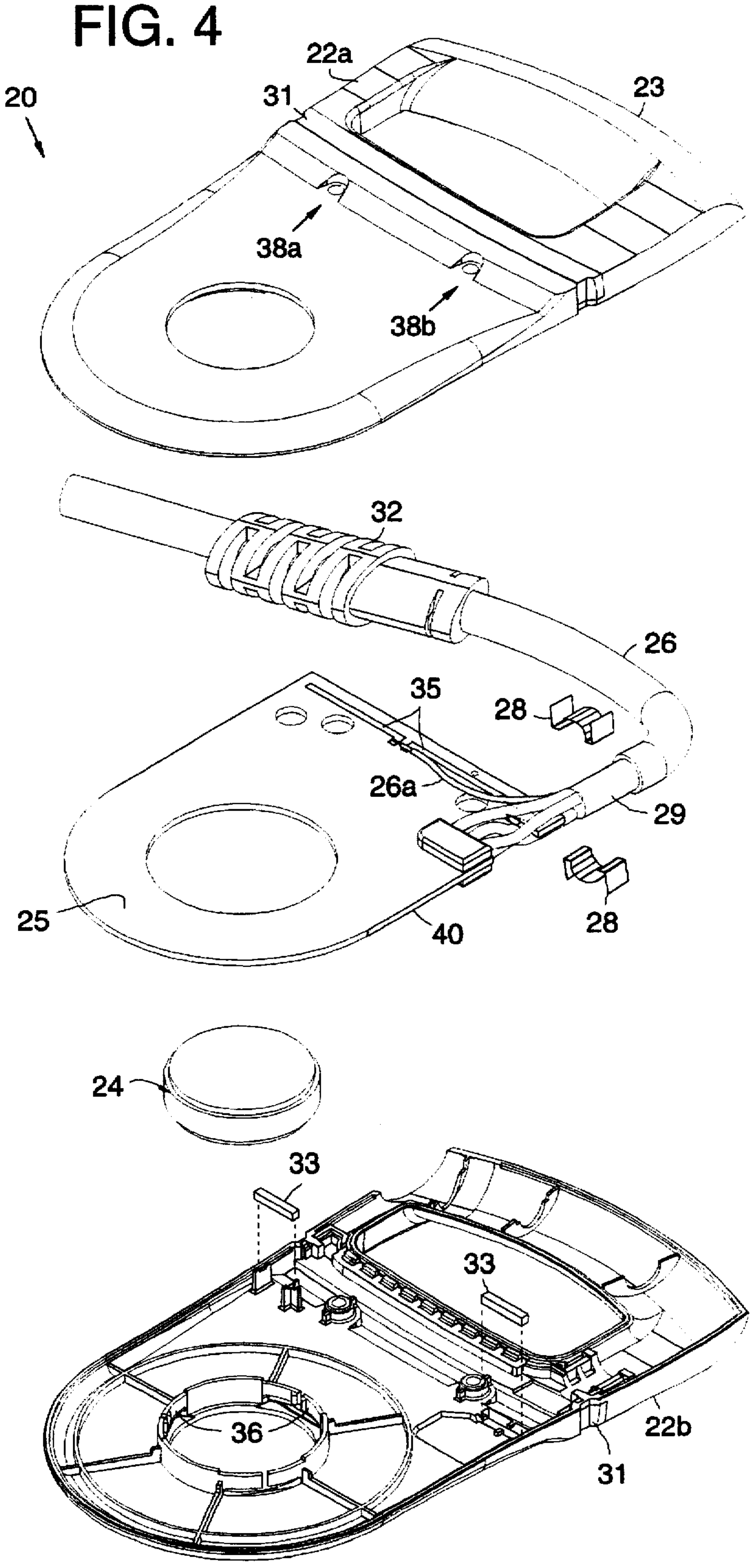
FIG. 4 is an exploded view of the inductive coupler of FIG. 2.

With specific reference to FIG. 4, it shows the internal assembly drawing of the inductive charging coupler 20. The primary winding 25 is in the form of a printed wiring board 40 and is attached to the charger cable 26 either by soldering or by screwing it down with lugs. A coaxial RF cable **26*a* that is part of the charger cable 26 is stripped and soldered to the antenna 35 which is part of the printed wiring board 40. The outer jacket of the charger cable 26 is stripped back to expose the outer braided shield 29. The shield 29 is sandwiched between two beryllium copper tabs that comprise the grounding clips 28 that dig into conductive fibers of the conductive plastic strips 31 which are insertion molded into the coupler 20. The ferrite puck 24 is held in the center of the coupler 20 with molded spring fingers 36 formed in the mating coupler halves 22*a*, 22*b*. The two magnets 33 disposed in the coupler 20 close the proximity switch in the charge port 15 upon insertion of the coupler 20 therein. The switch sends a signal to vehicle electronics that the coupler 20 has been inserted into the charge port 15**.

The coupler 20 incorporates a number of features that are described with reference to other patents and patent applications of the present assignee. The coupler 20 employs the conductive plastic strips 31 for EMI shielding as is described in U.S. Pat. No. 5,457,378 issued Oct. 10, 1995, entitled "Electromagnetically Shielded Inductive Charging Apparatus", tactile feel indents 37 as are described in U.S. Pat. No. 5,506,489, issued Apr. 2, 1996 entitled "Inductive Coupler Having a Tactile Feel", and locking provisions comprising the opening **38*a* and coupler stop 38*b* as are described in copending U.S. patent application Ser. No. 08/703,277, filed Aug. 26, 1996, entitled "Charger Locking Mechanism". The coupler has a thickness of 0.600 inches which has been chosen as a standard thickness for a standard mating charge port. U.S. Pat. No. 5,434,493, filed Jul. 18, 1995 entitled "Fixed Core Inductive Charger" describes a typical fixed inductive charge port 15 with which the present coupler 20 may be used. The coupler 20 also has a raised step 39 for the location of the conductive strip so EMI fingers inside the port 15 will not rub across the whole face of the coupler 20**, which minimizes unnecessary wear.

FIGS. **5*a*–5*g* illustrate artwork for layers 41–47 of the printed wiring board 40 employed in the inductive coupler 20 of FIG. 2. This type of artwork is also used for the secondary turns located in the charge port 15. FIG. 6 illustrates how the layers 41–47 of the printed wiring board 40 are attached to each other to form a four-turn primary winding 25**. This process can be used to increase or decrease the number of turns simply by adding or deleting board layers.

Thus, an improved inductive coupler having a primary winding and an antenna integrated into a printed wiring board and which may be used with an inductive charger system that is used to charge propulsion batteries of an electric vehicle has been disclosed.

It is to be understood that the above-described embodiment is merely illustrative of some of the many specific embodiments which represent applications of the principles of the present invention. Clearly, numerous and varied other arrangements may be readily devised by those skilled in the art without departing from the scope of the invention.

The embodiments of the invention in which an exclusive property or privilege is claimed are defined as follows:

1. An inductive charging coupler for use with inductive charging apparatus comprising a power source and a charge port disposed in an electric vehicle that is coupled to a battery of the electric vehicle, and wherein the coupler is insertable into the charge port to couple power from the power source to charge the battery of the electric vehicle, said coupler comprising:

a center magnetic core;

a printed wiring board disposed around the center magnetic core that comprises a plurality of printed circuit layers that each have a predetermined printed circuit pattern that together form a primary winding, and an antenna formed as an electrical trace on a selected one of said printed circuit layers;

a cable coupled between selected printed circuit layers of the primary winding and a power source for coupling energy to the charging coupler 20; and a coupler housing that has two mating coupler halves that are configured to provide a handle, and wherein the mating coupler halves enclose the printed wiring board, secure the center magnetic core, and secure the cable in the handle.

2. The inductive charging coupler of claim 1 wherein said cable includes a coaxial communications cable coupled to said antenna to couple communications signals between said power source and said charge port.

3. An inductive charging coupler for use with inductive charging apparatus comprising a power source and a charge port disposed in an electric vehicle that is coupled to a battery of the electric vehicle, and wherein the coupler is insertable into the charge port to couple power from the power source to charge the battery of the electric vehicle, said coupler comprising:

a center magnetic core;

a printed wiring board disposed around the center magnetic core that comprises a plurality of printed circuit layers that each have a predetermined printed circuit pattern that together form a primary winding;

a cable coupled between selected printed circuit layers of the primary winding and a power source for coupling energy to the charging coupler 20;

a coupler housing that has two mating coupler halves that are configured to provide a handle, and wherein the mating coupler halves enclose the printed wiring board, secure the center magnetic core, and secure the cable in the handle; and a plurality of grounding clips disposed in the handle that engage outer shielding of the cable.

4. The inductive charging coupler of claim 3 wherein the grounding clips are comprised of tinned copper.

5. An inductive charging coupler for use with inductive charging apparatus comprising a power source and a charge port disposed in an electric vehicle that is coupled to a battery of the electric vehicle, and wherein the coupler is insertable into the charge port to couple power from the power source to charge the battery of the electric vehicle, said coupler comprising:

a center magnetic core;

a printed wiring board disposed around the center magnetic core that comprises a plurality of printed circuit layers that each have a predetermined printed circuit pattern that together form a primary winding;

a cable coupled between selected printed circuit layers of the primary winding and a power source for coupling energy to the charging coupler 20;

a coupler housing that has two mating coupler halves that are configured to provide a handle, and wherein the mating coupler halves enclose the printed wiring board, secure the center magnetic core, and secure the cable in the handle, the mating coupler halves having molded spring fingers formed thereon for holding the center magnetic core in the coupler housing.

* * * * *